United States Patent
Bull et al.

(10) Patent No.: US 9,584,183 B2
(45) Date of Patent: Feb. 28, 2017

(54) FAULT IDENTIFICATION USING LINE ATTENUATIONS

(71) Applicant: BRITISH TELECOMMUNICATIONS PUBLIC LIMITED COMPANY, London (GB)

(72) Inventors: Philip Martin Bull, London (GB); David Michael Rohlfing, London (GB); Paul Robert Benyon, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/654,323

(22) PCT Filed: Dec. 6, 2013

(86) PCT No.: PCT/GB2013/000531
§ 371 (c)(1),
(2) Date: Jun. 19, 2015

(87) PCT Pub. No.: WO2014/096752
PCT Pub. Date: Jun. 26, 2014

(65) Prior Publication Data
US 2015/0349842 A1    Dec. 3, 2015

(30) Foreign Application Priority Data

Dec. 21, 2012    (EP) .................................... 12250187

(51) Int. Cl.
*H04M 1/24* (2006.01)
*H04M 3/08* (2006.01)
(Continued)

(52) U.S. Cl.
CPC .............. *H04B 3/48* (2013.01); *H04M 3/305* (2013.01); *H04M 11/062* (2013.01)

(58) Field of Classification Search
CPC .. H04M 3/2209; H04M 3/305; H04M 11/062; H04M 3/30; H04M 3/306;
(Continued)

(56) References Cited

U.S. PATENT DOCUMENTS

| 2004/0028189 A1* | 2/2004 | Bauer | H04M 3/30 |
| | | | 379/1.01 |
| 2004/0120470 A1* | 6/2004 | Cambron | H04L 12/2854 |
| | | | 379/1.04 |

(Continued)

OTHER PUBLICATIONS

International Search Report for PCT/GB2013/000531 mailed Aug. 12, 2014, three pages.

*Primary Examiner* — Quoc D Tran
(74) *Attorney, Agent, or Firm* — Nixon & Vanderhye PC (57) ABSTRACT

The present invention presents a method of identifying faults in a DSL line using upstream and downstream attenuation measurements, which can be obtained directly from the DSLAM or CPE, thus requiring no specialist test equipment nor disrupting service. A downstream over upstream attenuation ratio is calculated for a line, with calculations repeated over a population of lines. The distribution of ratios, as well as upper and lower thresholds, is determined based on the population. A line is identified as being potentially faulty if it has an attenuation ratio above the upper threshold or below the lower threshold. Specifically, an attenuation ratio below the lower threshold is identified as having a high resistance joint fault (caused by an imperfect connection or corrosion at a joint in at least one of the pairs of a line), and a ratio above the upper threshold as a shunt (caused by degradation of the insulation between the pairs of a line, and often coupled with water ingress).

11 Claims, 7 Drawing Sheets (51) Int. Cl.
*H04M 3/22* (2006.01)
*H04B 3/48* (2015.01)
*H04M 3/30* (2006.01)
*H04M 11/06* (2006.01)

(58) Field of Classification Search
CPC ...... H04M 3/08; H04M 3/2263; H04M 3/247; H04M 3/301
USPC ....... 379/1.01, 1.03, 1.04, 22.08, 23, 24, 28, 379/29.09
See application file for complete search history.

(56) References Cited

U.S. PATENT DOCUMENTS

| | | |
|---|---|---|
| 2006/0098725 A1 | 5/2006 | Rhee et al. |
| 2007/0036339 A1 | 2/2007 | Cioffi et al. |
| 2007/0195705 A1 | 8/2007 | Shrikhande et al. |
| 2008/0205501 A1* | 8/2008 | Cioffi .................. H04L 41/0803 375/224 |
| 2008/0285635 A1* | 11/2008 | Wang .................... H04M 3/306 375/224 |
| 2012/0232878 A1 | 9/2012 | Cunningham et al. |

* cited by examiner

FAULT IDENTIFICATION USING LINE ATTENUATIONS

This application is the U.S. national phase of International Application No. PCT/GB2013/000531 filed 6 Dec. 2013 which designated the U.S. and claims priority to EP 12250187.7 filed 21 Dec. 2012, the entire contents of each of which are hereby incorporated by reference.

FIELD OF THE INVENTION

This invention relates to a method of identifying a fault in a digital subscriber line in a telecommunications network, in particular a method of identifying certain fault conditions resulting from degradation in the metallic pair of a digital subscriber line.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an ISP.

Broadband lines are prone to faults. These result in slow line speeds or line drop outs, affecting a customer's service. Some of these faults are easily identified and rectified, such as missing micro-filters in the customer's home. Others are more complex, such as when a line is suffering from degradations in the copper pair at joints between wires or in the insulation surrounding the wires. Various techniques have been developed to help identify such faults.

One known method is to employ metallic line tests, where line test equipment at the telephone exchange runs various line tests. These are typically electrical tests, and the resulting measurements, such as resistance, capacitance and so on, are used to look for various line conditions on the metallic path. Such tests are intended to identify PSTN faults, and can lack sensitivity to fault conditions that affect broadband. Indeed, some of the testing will mask certain faults, as in certain situations the test itself can clear the fault condition as a result of the voltages being applied to the lines. Such testing also requires that specialist test equipment be connected to the line, requiring PSTN and DSL services to be temporarily disabled whilst the testing takes place. The test equipment typically requires some sort of relay to switch in and those relays tend to have a limited lifespan.

Other methods similarly employ specialist test equipment, for example interacting with the training tones from the customer premises equipment (the DSL modem).

SUMMARY OF THE INVENTION

It is the aim of embodiments of the present invention to provide an improved method of identifying faults in a digital subscriber line in the telecommunications network.

According to one aspect of the present invention, there is provided a method of identifying a fault condition in a digital subscriber line in a telecommunications network, said method comprising:
  determining an upstream line attenuation and a downstream line attenuation associated with the digital subscriber line;
  calculating a line attenuation ratio for said digital subscriber line based on the downstream and upstream line attenuations;
  comparing the calculated line attenuation ratio to the line attenuation ratio distribution calculated from a population of digital subscriber lines;
  determining a condition of the digital subscriber line in dependence on the result of the comparison.

The line attenuation ratio distribution can comprise an upper threshold of attenuation ratio and a lower threshold of attenuation ratio, with the upper and lower thresholds defining a range of attenuation ratios within which the majority of the population of digital subscriber lines reside.

The determined condition may be a fault when the calculated line attenuation ratio is below the lower threshold or above the upper threshold. The fault may be a high resistance connection if the calculated line attenuation ratio is below the lower threshold. The fault may be a shunt if the calculated line attenuation ratio is above the upper threshold.

Preferably, the line attenuation ratio is the ratio of downstream line attenuation over upstream line attenuation.

The invention has the advantage of not requiring any specialist test equipment. Further, the measurements required are taken from the DSLAM, or the customer's modem, without disrupting any of the services provided to the customer.

The nature of electrical line testing means that testing is performed infrequently or as a "one-shot" test in response to a fault report. The dynamic nature of certain faults can give rise to "false green" OK test results. Because DSL parameters such as attenuation can be harvested at regular and frequent intervals, the condition of a line can be continuously monitored, allowing detection of intermittent faults and degrading line conditions.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of identifying faults in a DSL line using upstream and downstream attenuation measurements, which can be obtained directly from the DSLAM or CPE, thus requiring no specialist test equipment nor disrupting service. A downstream over upstream attenuation ratio is calculated for a line, with calculations repeated over a population of lines. The distribution of ratios, as well as upper and lower thresholds, is determined based on the population. A line is identified as being potentially faulty if it has an attenuation ratio above the upper threshold or below the lower threshold. Specifically, an attenuation ratio below the lower threshold is identified as having a high resistance joint fault (caused by an imperfect connection or corrosion at a joint in at least one of the pairs of a line), and a ratio above the upper threshold as a shunt (caused by degradation of the insulation between the pairs of a line, and often coupled with water ingress).

Figure 1:
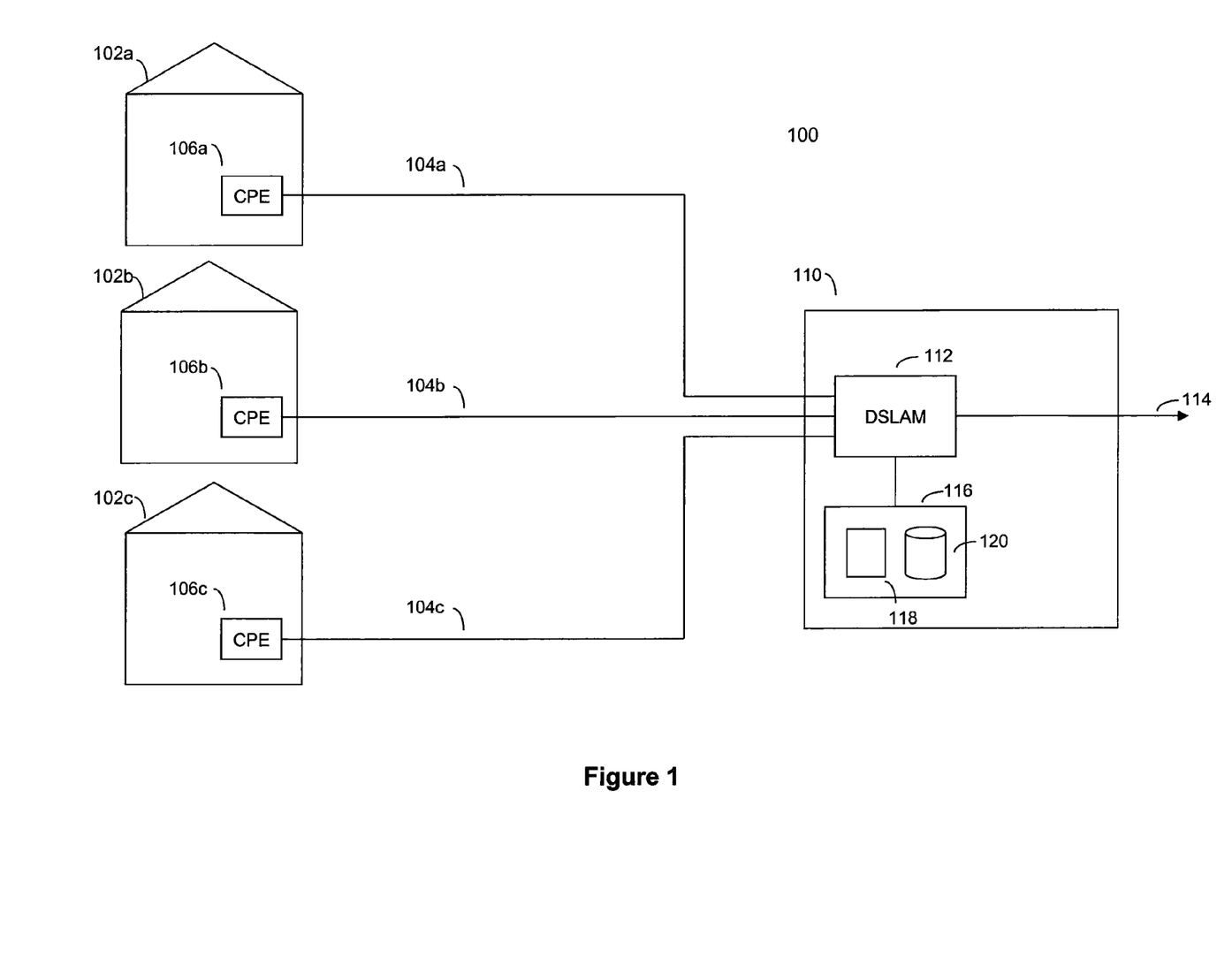
FIG. 1 is a system diagram showing a telephone exchange and lines running to several customer premises.

FIG. 1 illustrates a telecommunications network 100 including 3 customer's premises 102a, 102b and 102. Each of the customer's premises 102a, 102b and 102c is connected to a telephone exchange 110 via respective telephone lines 104a, 104b and 104c. Each of the telephone lines is a twisted copper or aluminium pair of wires. Specifically, a customer premises equipment 106a, 106b or 106c, connect to the end of each of the lines at the customer premises end. At the other end of each line at the exchange 110, the lines terminate at a digital subscriber line access multiplexer, DSLAM, 112. The DSLAM provides digital subscriber line (DSL) services to connected lines and associated customer premises. The connected lines can thus also be referred to as digital subscriber lines, or DSL lines. At the exchange is also a fault detection unit 116, connected to the DSLAM 112. The fault detection unit 116 comprises a processor 118, and a data store 120, such as hard disk array or similar. The fault detection unit 116 is able to gather various measurements made by the DSLAM 112, store them in the data store 120, and use them for detecting potential faults on any of the connected lines.

Some of the measurements that the fault detection unit 116 can collect from the DSLAM 112 are attenuation values associated with a line. The attenuation is effectively a measure of the signal loss experienced on a line, and is measured in dB. As data is transmitted in discrete frequency bins in a DSL system, attenuation is measured as a function of frequency.

Figure 2:
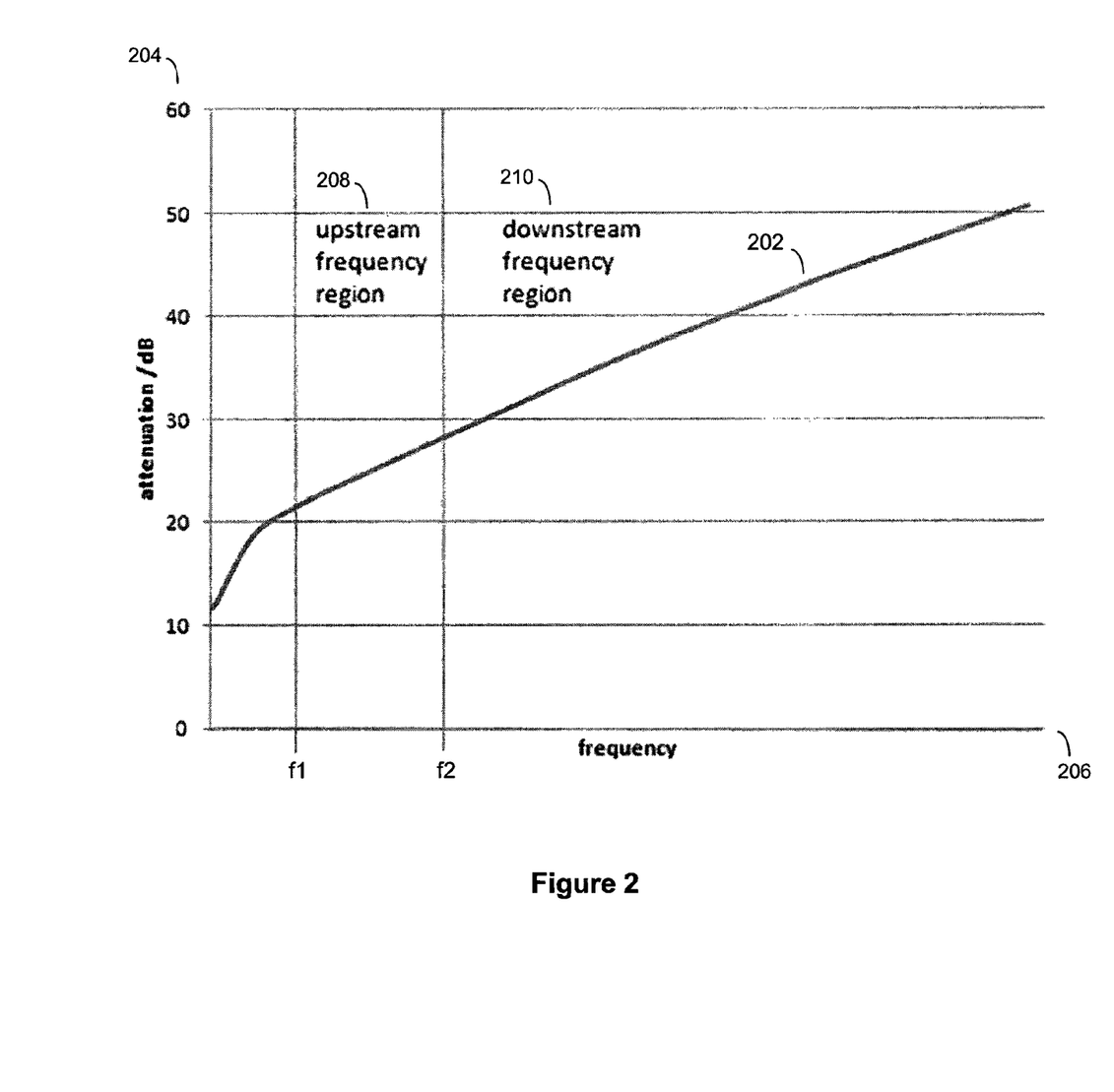
FIG. 2 is a graph of attenuation plotted against frequency for a typical digital subscriber line.

FIG. 2 shows a graph 202 shows a curve 202 of attenuation plotted against frequency for an ideal DSL line (a line not experiencing any faults). On the y-axis is attenuation in dBs, and on the x-axis is frequency 206. On the frequency axis are labelled two points, f1 and f2, which define the boundaries for data transmission on the line. The region between f1 and f2 is used for upstream data transmissions ("up" from the CPE to the DSLAM), and the region above f2 is used for downstream data transmissions ("down" to the CPE from the DSLAM). Thus, the region between f1 and f2 has been labelled "upstream frequency region" 208, and the region above f2 labelled "downstream frequency region" 210.

A single value of the upstream line attenuation can be determined for a line from the range of values from the graph 202, by only considering the attenuations that lie within the upstream data transmissions region 208 between f1 and f2. More specifically, the upstream line attenuation can be equated to an average of the attenuation values within the upstream region, or a midpoint for example.

Similarly, a single value of the downstream line attenuation can be determined by considering the attenuations for the downstream region 210 only. Thus, the downstream line attenuation can be equated to an average of the attenuation values within the downstream region, or a midpoint for example.

The data shown in FIG. 2 is automatically generated by the DSLAM 112, and can thus be collected at any time by the fault detection unit 116, and stored in the data store 120. The single values for upstream and downstream line attenuations can be determined by the fault detection unit 116 based on the measurements gathered from the DSLAM 112, or can be generated by the DSLAM 112 depending on the configuration of units.

Figure 3:
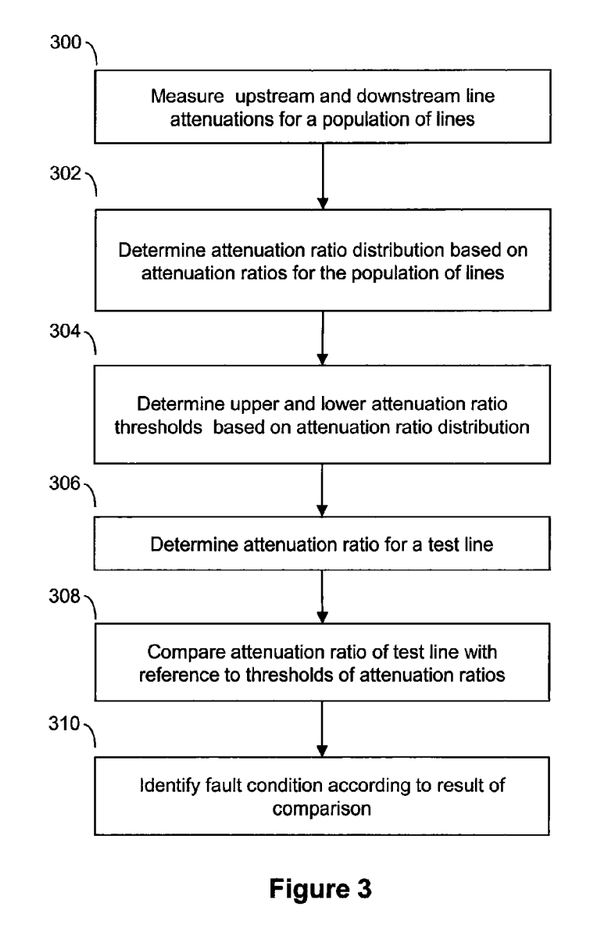
FIG. 3 is a flow chart summarising the steps of an example of the invention.

FIG. 3 is a flow chart summarising the steps of the present invention.

Processing starts in step 300, where the upstream and downstream line attenuation measures are gathered for a large population of lines in the network (for example 104a, 104b, 104c and others) by the fault detection unit 116 from the DSLAM 112. These are the single value, average measures described above. The attenuation values are stored in the data store 120.

In step 302, the attenuation values for the population of lines are analysed to determine an attenuation ratio for each line given by equation (1) below.

$$\text{attenuation ratio} = \text{downstream attenuation}/\text{upstream attenuation} \quad (1)$$

Figure 4:
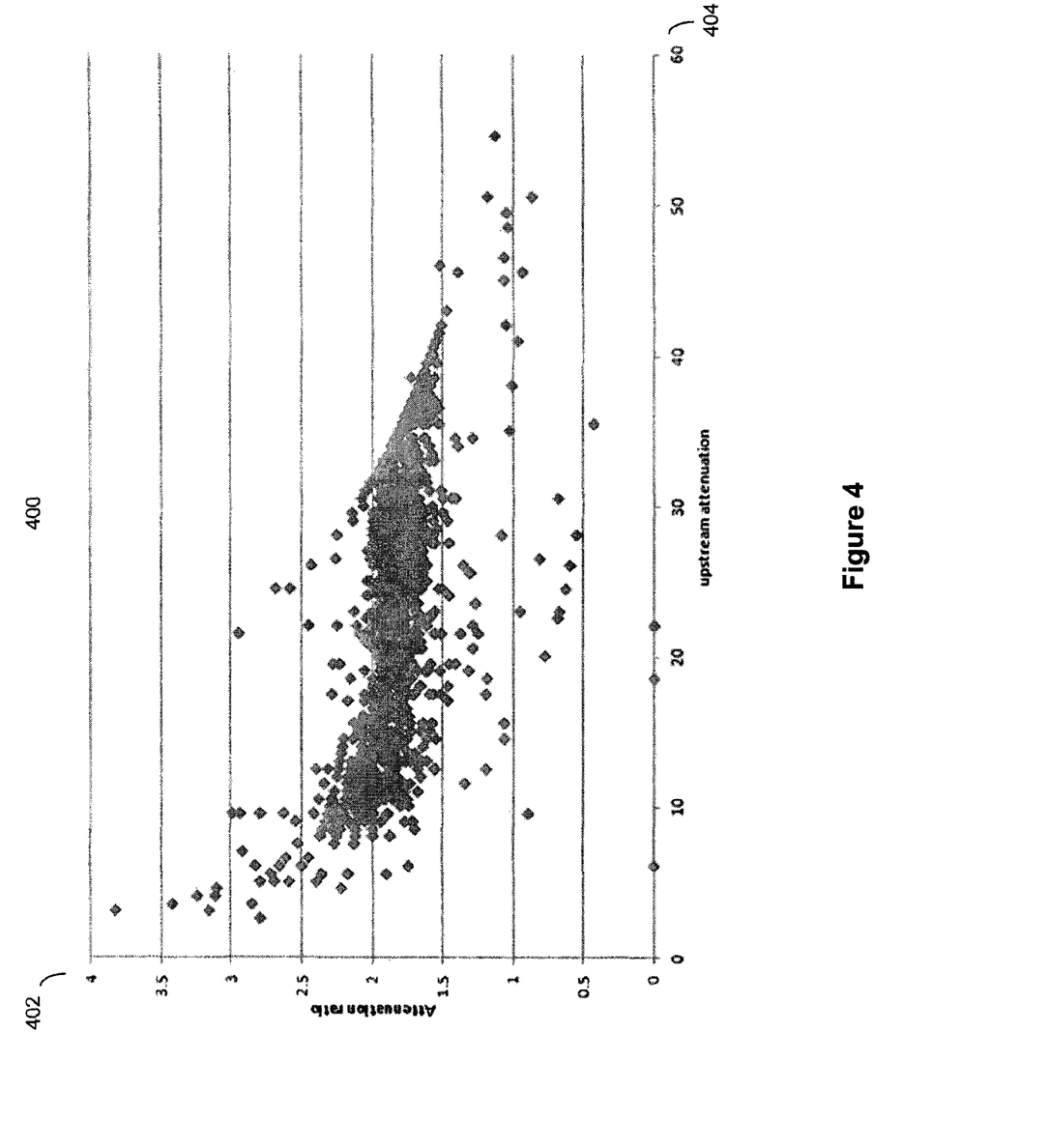
FIG. 4 is a graph showing calculated attenuation ratios plotted against upstream attenuation for a population of lines.
Figure 5:
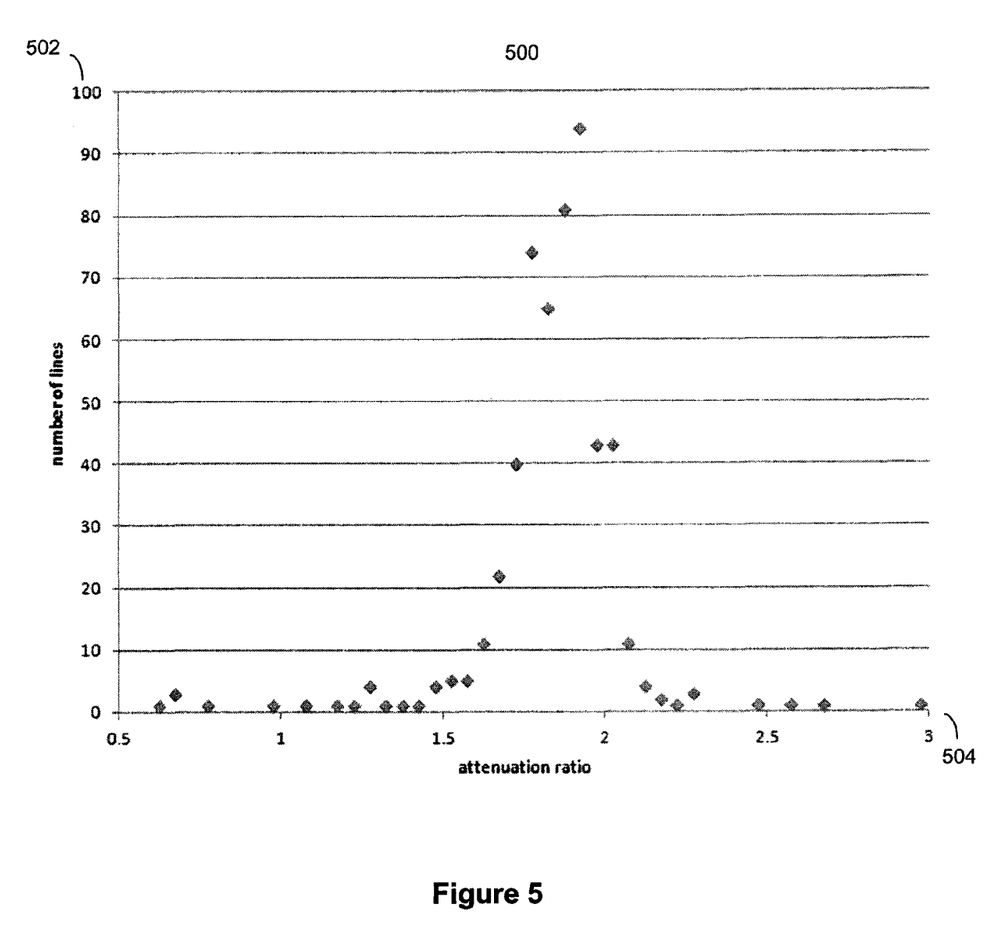
FIG. 5 is a graph showing the frequency distribution for attenuation ratios of a population of lines with upstream attenuation in the range 10 to 30 dB.

FIG. 4 is a graph showing calculated attenuation ratios 402 for the population of lines plotted against upstream attenuation 404. It can be observed that the majority of lines are clustered around a peak count of lines having an attenuation ratio of 1.8 for an upstream attenuation of between 10 to 30 dB. FIG. 5 shows the frequency distribution for attenuation ratios of lines with upstream attenuation in the range 10 to 30 dB for the sample population, and where it is clear that the majority of lines sit around the peak of 1.8.

In step 304 the distribution of attenuation ratios is analysed to determine upper and lower thresholds for the attenuation ratios of the population of lines. In one approach, a lower threshold may be observed where there is a sharp decrease in the number of lines as the attenuation ratio value is decreased. This threshold can be more accurately determined using peak fitting techniques. For example, 10% of the peak value can be used to determine a threshold point. Thus, if the peak value is 95 lines here, then 10% of the peak value gives 9.5, which occurs at an attenuation ratio of around 1.6. Thus 1.6 would be used as our lower threshold. However, it may be advantageous to round the value further down to, say 1.5, to ensure that lines only just on the low side of the peak are not included.

An upper threshold can be determined using a similar approach, but examining the higher side of the peak.

For lines with lower upstream attenuations (less than 10 dB in this example) the graph in FIG. 4 suggests that the "peak count" attenuation ratio increases. And for higher upstream attenuations (more than 30 dB) the graph suggests that the "peak count" value of attenuation ratio decreases. Thus, a fuller model of the peak, lower threshold and upper threshold attenuation ratios can be obtained using the peak fitting method outlined above using sample populations from each of the distinct upstream attenuation ranges.

The upper and lower thresholds, together with the peak line attenuation value, are stored in the data store 120, and can be used at any later time to determine whether there is a fault condition on a line.

The thresholds effectively define a range of values between which a line is considered to be operating normally. It has been found that a very significant proportion of lines with attenuation ratios falling outside this range, either above the upper threshold or below the lower threshold, suffer from a fault on the line. More specifically, it has been found that lines having an attenuation ratio above the upper threshold tend to suffer from one type of fault, and lines having an attenuation ratio below the lower threshold suffer from another type of fault.

Step 306 onwards describes a method of identifying a fault condition on a digital subscriber line using the calculated thresholds.

In step 306, a test digital subscriber line in the network 100 is selected for analysis, and the attenuation ratio of the line is determined according to equation (1). The upstream and downstream attenuation values upon which the attenuation ratio is calculated can be measured dynamically when the line is selected, or can be retrieved from the data store 120 from earlier measurements, for example from step 300.

In step 308, the calculated attenuation ratio for the test line is compared to the distribution of attenuation ratios of the population of lines, and specifically the thresholds from steps 302 and 304.

Figure 6:
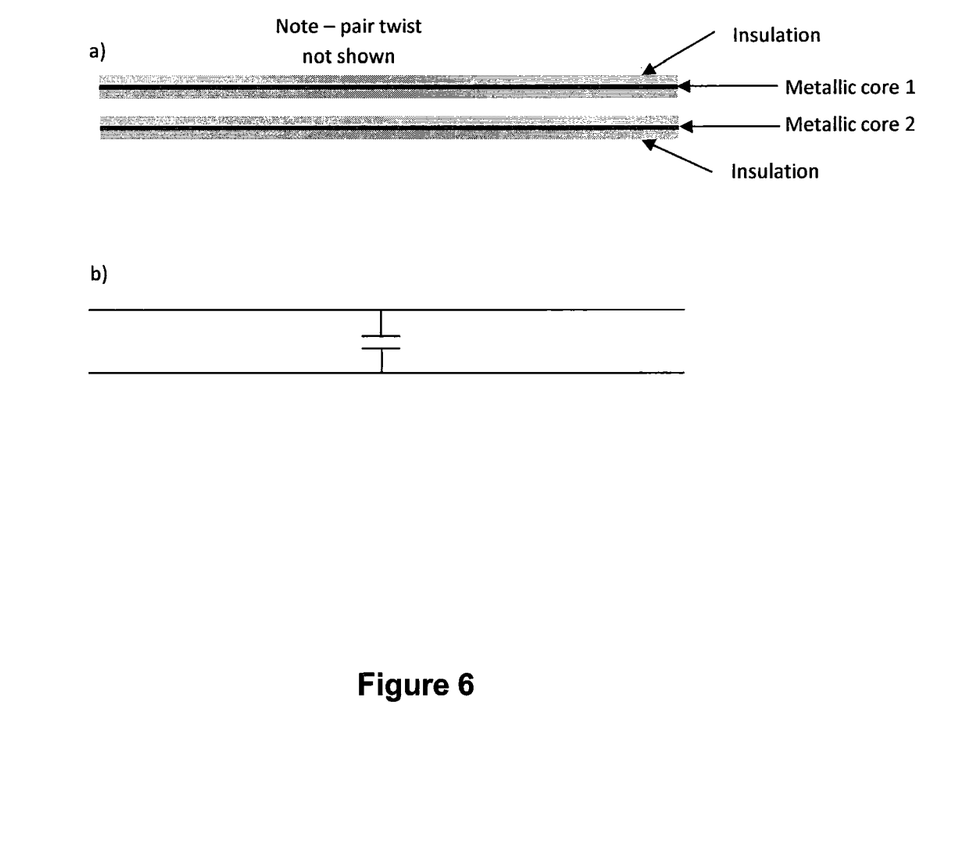
FIG. 6 illustrates a wire suffering from a shunt fault.

In step 310, if the attenuation ratio of the test line is above the upper threshold, then a first type of fault is condition identified. Specifically, this first type of fault is a shunt. FIG. 6a illustrates a section of a line made up of a pair of insulated wires. A shunt typically occurs when there is some damage or deterioration to the insulation around the wires, coupled with water ingress. The result is a capacitive effect across the pair of wires, which is illustrated electrically in FIG. 6b, which shows a pair of wires with a capacitor in parallel across the wires. In this situation, high frequencies are attenuated more than normal compared to low frequencies. In other words, downstream attenuation tends to increase relative to the upstream attenuation, resulting in an increase in the attenuation ratio.

Figure 7:
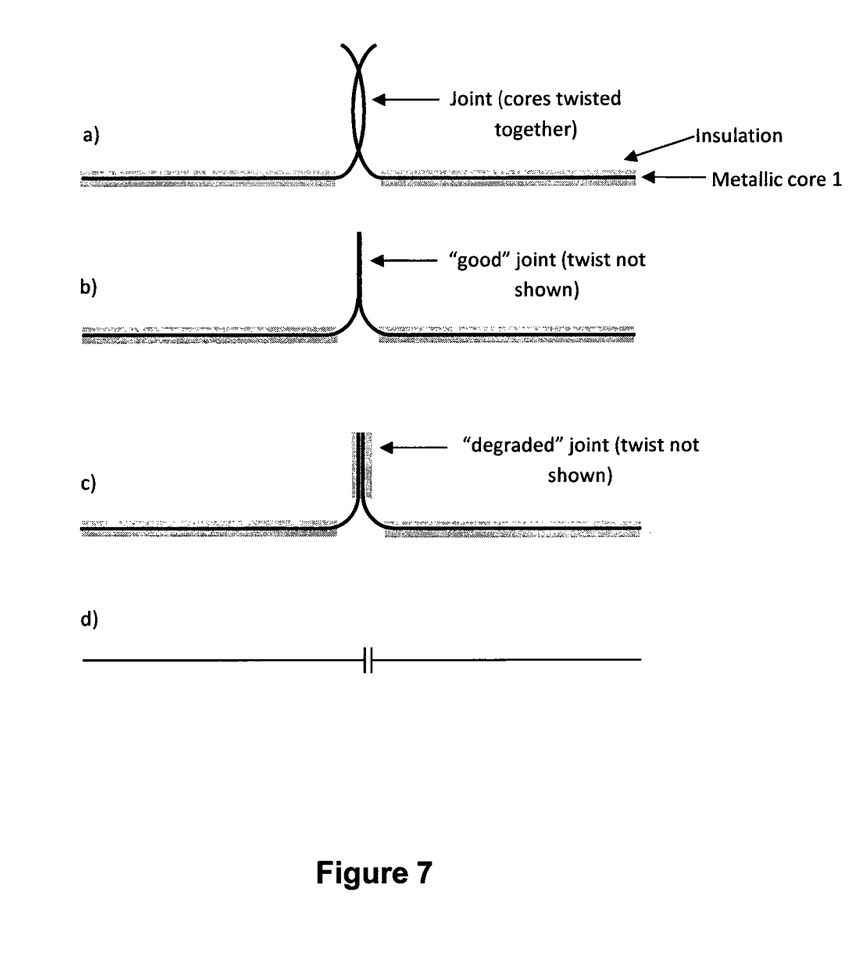
FIG. 7 illustrates a wire suffering from a high resistance connection fault.

Conversely, if the attenuation ratio of the test line is below the lower threshold, then a second type of fault condition is identified. Specifically, this second type of fault is a high resistance connection, typically referred to as an "HR joint", affecting a join between sections of wiring. It is perhaps more accurate to describe such a condition as an impedance in the metallic path as it is usually not simply resistive and may include capacitive and rectifying junction characteristics. In good joints, the "clean" core metal of each end section of wiring are touching each other, and a twist is usually applied or compression crimp connector fitted to maintain the contact. FIG. 7a shows a (stylised) twisted joint between two sections of a single metallic core wire. Ideally, the physical contact is maintained along the length of the joint as illustrated in FIG. 7b where the same stylised joint is shown but with no twist applied. This results in a good electrical joint of low impedance. Whilst it is common for such joints to be given a further protective covering treatment, as well as electrical insulation, they are still prone to degradation. FIG. 7c shows a joint where the metal core has reacted to form surface chemical compounds that can behave as a dielectric insulator. This might happen over time simply due to oxidation from exposure to the air, or can happen more rapidly if water comes into contact with the joint. Electrically, this type of fault behaves like a series capacitance as illustrated in FIG. 7d. In such situations, the attenuation of low frequencies increases relative to higher frequencies, thus disproportionately affecting the upstream path. In other words, upstream attenuation tends to increase relative to the downstream attenuation, resulting in a decrease in the attenuation ratio.

Should the attenuation ratio of the test line fall between the two threshold values, then the line is identified as behaving normally.

Thus, it is possible to identify a fault condition by analysing the attenuation ratio of a line, and comparing that ratio to the distribution of attenuation ratios of a population of lines, and more specifically, comparing to upper and lower thresholds for attenuation ratio generated from the population of lines. The fault condition may be a shunt, a high resistance connection, or the line may be fault free. If a fault is identified, an engineer can be provided with the relevant fault details in order for it to be fixed.

As both upstream and downstream attenuations vary with the length of a line, use of an attenuation ratio effectively normalises line length variations in the analysis.

The method can also be restricted to a specific DSL product, for example one of ADSL, ADSL2+, or SDSL. In such a case, the population of lines used in determining peak attenuation ratio and associated thresholds are restricted to lines for a specific DSL service/product, with the test line also belonging to the same service/product. This is to avoid variations in attenuations that might arise across different products, which can occur if the upstream and downstream frequency regions or measurement method are not defined in a similar manner.

The method of identifying a fault condition on a line can be repeated over time to determine whether a fault is intermittent or persistent, and also to gain a measure of the stability of the line.

In an alternative example, separate fault detection units 116 can reside in each of the CPEs and be used to perform the operation of steps 306 to 310 and identify a fault on a line. The individual fault detection units will need to be provided with the threshold values, as these are based on measurements from a population of lines. Similarly, the fault detection unit may reside in a handheld tester used by field engineers, instead of in the CPE. The same method can be used in such a handheld tester, again based on steps 306 to 310 of the above method.

Exemplary embodiments of the invention are realised, at least in part, by executable computer program code which may be embodied in an application program data. When such computer program code is loaded into the memory of the CPU 118 in the fault detection unit 116, it provides a computer program code structure which is capable of performing at least part of the methods in accordance with the above described exemplary embodiments of the invention.

A person skilled in the art will appreciate that the computer program structure referred can correspond to the flow charts shown in FIGS. 3 and 4, where each step of the flow chart can correspond to at least one line of computer program code and that such, in combination with the CPU 118 in the fault detection unit 116, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of identifying a fault condition in a digital subscriber line in a telecommunications network, said method comprising:
   i) determining an upstream line attenuation and a downstream line attenuation associated with the digital subscriber line;
   ii) calculating a line attenuation ratio for said digital subscriber line based on the downstream and upstream line attenuations;
   iii) comparing the calculated line attenuation ratio to the line attenuation ratio distribution calculated from a population of digital subscriber lines;

iv) determining a condition of the digital subscriber line in dependence on the result of the comparison; wherein:

the line attenuation ratio distribution comprises an upper threshold of attenuation ratio and a lower threshold of attenuation ratio, said upper and lower thresholds defining a range of attenuation ratios within which the majority of the population of digital subscriber lines reside; and the determined condition is a fault when the calculated line attenuation ratio is below the lower threshold or above the upper threshold.

2. A method according to claim 1, wherein the fault is a high resistance connection if the calculated line attenuation ratio is below the lower threshold.

3. A method according to claim 1, wherein fault is a shunt if the calculated line attenuation ratio is above the upper threshold.

4. A method according to claim 1, wherein the line attenuation ratio is the ratio of downstream line attenuation over upstream line attenuation.

5. A method according to claim 1, wherein the upper and lower thresholds are determined using a peak fitting method on the attenuation ratios.

6. A fault detection unit for identifying a fault condition in a digital subscriber line in a telecommunications network, the fault detection unit comprising:
   a memory for storing computer readable instructions;
   a computer processor for executing the instructions so that the fault detection unit is configured to:
   i) determine an upstream line attenuation and a downstream line attenuation associated with the digital subscriber line;
   ii) calculate a line attenuation ratio for said digital subscriber line based on the downstream and upstream line attenuations;
   iii) compare the calculated line attenuation ratio to the line attenuation ratio distribution calculated from a population of digital subscriber lines;
   iv) determine a condition of the digital subscriber line in dependence on the result of the comparison; wherein:

the line attenuation ratio distribution comprises an upper threshold of attenuation ratio and a lower threshold of attenuation ratio, said upper and lower thresholds defining a range of attenuation ratios within which the majority of the population of digital subscriber lines reside; and the determined condition is a fault when the calculated line attenuation ratio is below the lower threshold or above the upper threshold.

7. The fault detection unit according to claim 6, wherein the fault is a high resistance connection if the calculated line attenuation ratio is below the lower threshold.

8. The fault detection unit according to claim 6, wherein fault is a shunt if the calculated line attenuation ratio is above the upper threshold.

9. The fault detection unit according to claim 6, wherein the line attenuation ratio is the ratio of downstream line attenuation over upstream line attenuation.

10. The fault detection unit according to claim 6, wherein the telecommunications network includes user's premises equipment and a telephone exchange which communicate via the digital subscriber line, and the fault detection unit resides in the user's premises equipment.

11. The fault detection unit according to claim 6, wherein the fault detection unit resides in a handheld device.

* * * * *